Figure 1:
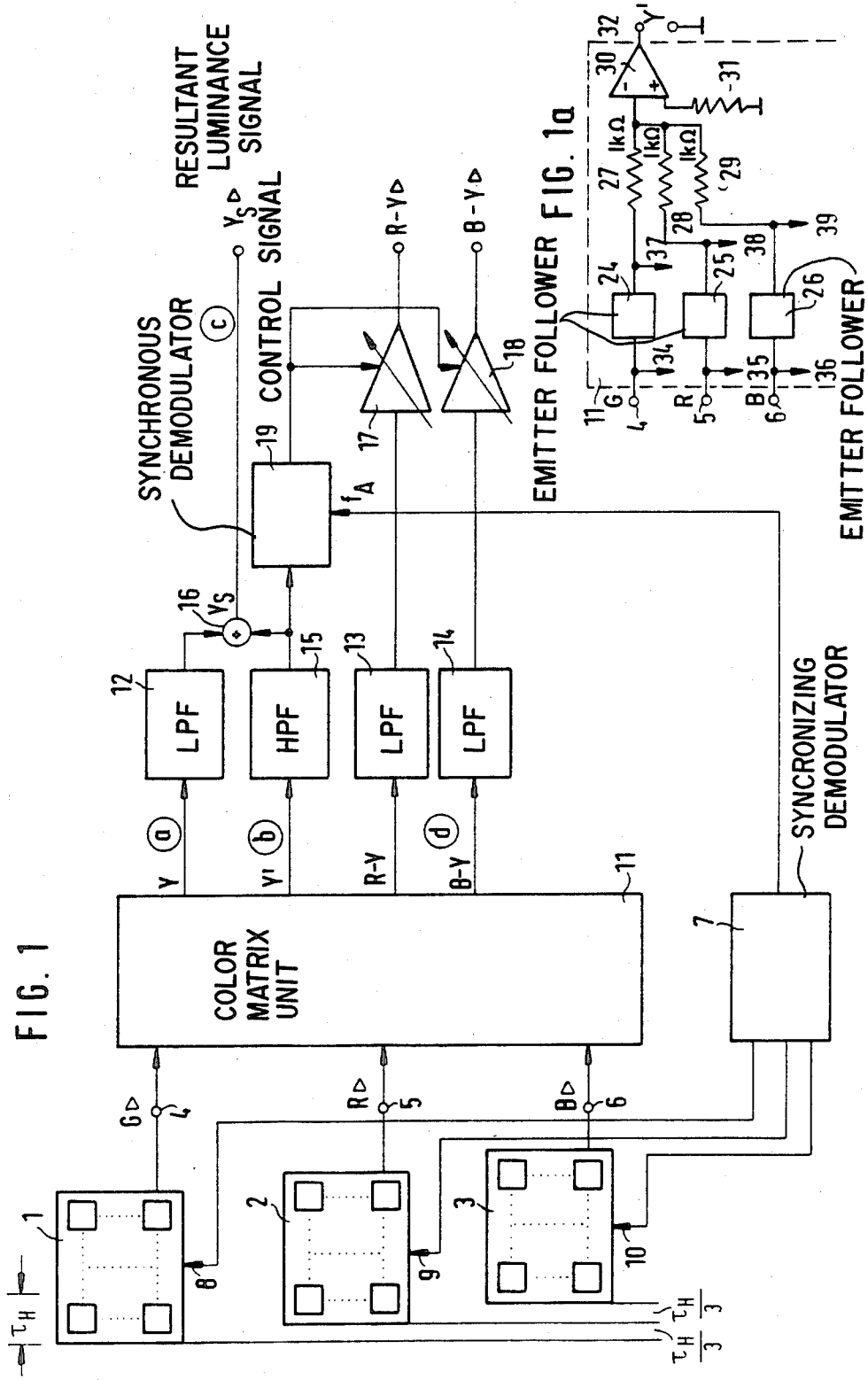

United States Patent [19]

Buchwald

[11] Patent Number: 4,725,881
[45] Date of Patent: Feb. 16, 1988

[54] METHOD FOR INCREASING THE RESOLUTION OF A COLOR TELEVISION CAMERA WITH THREE MUTUALLY-SHIFTED SOLID-STATE IMAGE SENSORS

[75] Inventor: Wolf-Peter Buchwald, Evessen-Hachum, Fed. Rep. of Germany

[73] Assignee: Robert Bosch GmbH, Stuttgart, Fed. Rep. of Germany

[21] Appl. No.: 840,573

[22] PCT Filed: May 3, 1985

[86] PCT No.: PCT/DE85/00142
§ 371 Date: Jan. 17, 1986
§ 102(e) Date: Jan. 17, 1986

[87] PCT Pub. No.: WO85/05526
PCT Pub. Date: Dec. 5, 1985

[30] Foreign Application Priority Data
May 19, 1984 [DE] Fed. Rep. of Germany ....... 3418787

[51] Int. Cl.[4] .......................... H04N 9/09; H04N 9/04
[52] U.S. Cl. .......................................... 358/50; 358/43
[58] Field of Search ..................... 358/43, 50

[56] References Cited

U.S. PATENT DOCUMENTS

| | | | |
|---|---|---|---|
| 4,220,977 | 9/1980 | Yamanaka | 358/41 |
| 4,249,203 | 2/1981 | Yamanaka | 358/50 |
| 4,507,677 | 3/1985 | Reimers | 358/50 |

FOREIGN PATENT DOCUMENTS 2846869  5/1979  Fed. Rep. of Germany .

*Primary Examiner*—James J. Groody
*Assistant Examiner*—Randall S. Svihla
*Attorney, Agent, or Firm*—Michael J. Striker

[57] ABSTRACT

A process for increasing the resolution of color television solid state cameras provided with three semiconductor image sensors, each assembled of an array of optoelectric elements, includes: geometrically offsetting the sensors in horizontal direction by one third of the distance between the optoelective elements; phase-shifting scanning signals applied to respective sensors by 120°; generating standard signals for luminance and chrominance and matrixing an additional luminance signal; low-pass filtering the standard signals and high-pass filtering the additional luminance signal; and adding the filtered standard and additional luminance signals to produce a resultant luminance signal of higher resolution. A control signal is derived from the high-pass filtered additional luminance signal and is used for controlling amplitudes of the color-difference signals.

5 Claims, 4 Drawing Figures

METHOD FOR INCREASING THE RESOLUTION OF A COLOR TELEVISION CAMERA WITH THREE MUTUALLY-SHIFTED SOLID-STATE IMAGE SENSORS

STATE OF THE ART

The invention is based on a process for increasing the resolution of color television cameras of the type which includes three semiconductor-image sensors, each sensor including an array of optoelectric sensing elements spaced apart one from the other in horizontal and vertical directions by an equal distance, means for scanning line-by-line said sensing elements in the respective sensors to produce output signals corresponding to three different colors, the position of a first sensor being offset in the horizontal direction by one third of the equal distance relative to a second sensor and by two third of the equal distance relative to a third sensor, the scanning means including means for generating three scanning signals applied to the respective sensors, a scanning signal for the second sensor being phase shifted by 120° and a scanning signal for the third sensor by 240° relative to a scanning signal for the first sensor, means for matrixing the output signals from the respective sensors to generate a standard luminance signal and standard color-difference signals, and means for low-pass filtering the standard signals.

In contrast to video camera tubes, the semiconductor image sensors represent a scanning system wherein the illuminated optical information is scanned in two dimensions by discrete image spots. The resolution of the generated video signal is therefore calculated in accordance with the scanning theorem, namely directly by the number of image spots to be realized on the image sensor.

Therefore, an increase in the resolution is only possible by a technically very problematic increase of the number in image spots of the semiconductor-image sensor.

However, after an accurate testing of the signal frequency spectrum at the output of a semiconductor-image sensor possibilities are available to increase the resolution by a suitable signal processing without technological measures. The frequency spectrum is the one of a pulse amplitude modulated signal which consists of a component in the base band as well as components which are grouped by a multiple of a carrier frequency. The actual limiting of the resolution in accordance with the scanning theorem results from the fact that the carrier frequency signal components generate signal components in the base band which falsify the base band signal. However, if it is possible to eliminate the carrier frequency components a higher resolution is made possible, even with a limited amount of image spots.

A solid state television camera with a plurality of semiconductor-image sensors is already known from West German Offenlegungsschrift 28 46 869, wherein the resolution of the television camera can be also improved by means of a suitable geometric disposition of the semiconductor-image sensors and corresponding signal processing. However, the proposed signal processing serves, primarily for shifting the phase of the output signals of the image sensors in accordance with their horizontal offsetting with respect to each other and this circuit is very expensive.

It is therefore an object of the invention to provide a process for increasing the resolution of television cameras with semiconductor-image sensors, wherein the signal processing can be made simpler and performed more effectively.

ADVANTAGES OF THE INVENTION

The process in accordance with the invention includes the steps of the uniformly weighting and adding said output signals from the respective sensors to generate an additional luminance signal; high-pass filtering said additional luminance signal, adding the high-pass filtered additional luminance signal to said standard luminance signal to produce a resultant luminance signal; and deriving from said high-pass filtered luminance signal a control signal for said standard color-difference signals. The process is advantageous in that it is not only less expensive but any interfering components which still may be present can be practically completely eliminated.

Particularly advantageous is the use of a synchronous demodulator for shunting off the control signal from the high pass filtered additional luminance signal, whereby it is assured that real color being present is not suppressed at high luminance frequencies, while during a black/white oscillation a false chrominance from alias frequencies is prevented.

DRAWINGS

Figure 2:
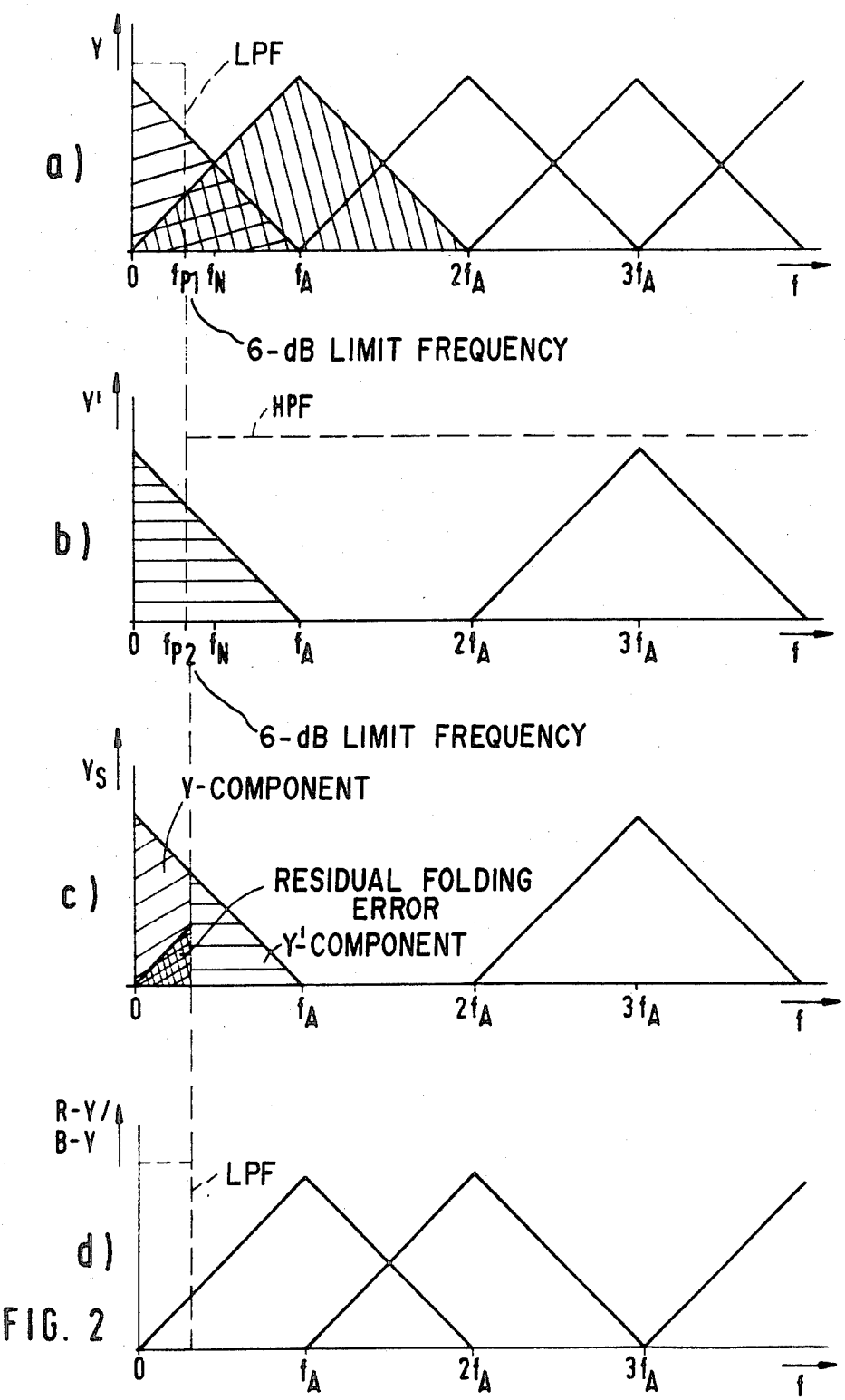
Figure 3:
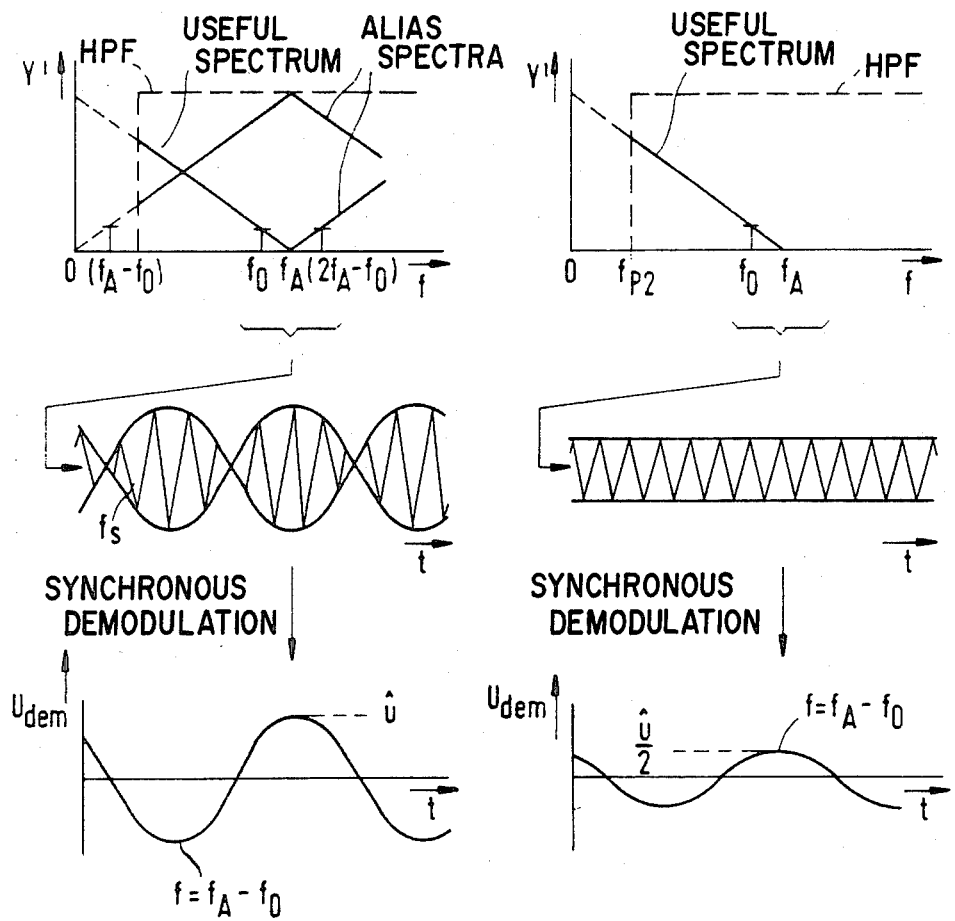

One exemplified embodiment for performing the process in accordance with the invention is illustrated in the drawings and is explained in more detail in the subsequent description, whereby only these parts are illustrated which are important for the invention. The drawings show:

FIG. 1 a block circuit diagram for performing the process in accordance with the invention, FIG. 1a a block circuit diagram of a part of the color matrix illustrated in FIG. 1, FIG. 2 frequency spectra of the video signals shown in FIG. 1, FIG. 3 spectra and time sequences of the signals in a color or a black/white format.

FIG. 1 illustrates a part of a color television camera with three semiconductor-image sensors 1,2,3 including corresponding color filters (not illustrated) for generating a green signal G, a red signal R and a blue signal B of a single image focused on the respective image sensors 1,2,3. Each of the three image sensors 1,2,3 includes an array of discrete image spots, whose geometric period or equal distance in horizontal and vertical directions is $\tau_H$. Three output signals G,R and B are phase-shifted due to a horizontal displacement of the individual image sensors 1,2,3 against each other by a third of the image spot period ($\tau_H/3$), whereby base band components of the same phase and carrier frequency components of the first and second order which are mutually phase shifted by 120°, are picked up on the terminals 4,5,6. Thereby, the reading or scanning cycle control is performed by three reading or scanning cycle frequencies which are phase shifted with respect to each other by 120° and which are generated by a synchronizing generator 7, whereby these reading cycle frequencies are fed to the image sensors 1,2,3 at control inputs 8,9,10.

The color signals G,R,B from the terminals 4,5,6 are fed to a color matrix unit 11 in which, in a known manner, a standard luminance signal $Y = 0.30R + 0.59G + 0.11B$ as well as standard color difference signals R-Y and B-Y are generated. These standard signals Y and R-Y or B-Y, whose scanning spectra are illustrated in FIGS. 2a and 2d, are fed through corresponding low pass filters 12,13,14.

The before described offset position of the three semiconductor-image sensors 1,2,3 in the horizontal direction by which the obtainable resolution, as known, is triple of that of the individual image sensor, can be used to convert the luminance component of the color signal into a modified luminance signal having a higher resolution. This presumes that the output signals R,G,B of the three semiconductor-image sensors must be uniformly weighted and added in accordance with Y'=0.33R+0.33G+0.33B, so as to generate an additional luminance component. This addition is performed in the color matrix unit 11 by means of the circuit illustrated in FIG. 1a. The color signals G,R,B which are present at the output terminals 4,5,6 are fed through assigned emitter follower stages 24,25,26 and through resistors 27,28,29 having the same value (for example 1 kΩ). The resistors 27,28,29 are connected to one input of a difference amplifier 30, whose other input is connected with ground by means of a resistor 31. The additional luminance signal Y' is then picked up at the output 32. The branching of respective signals as indicated by arrows 34,35,36 and 37,38,39 in FIG. 1a relates to the known further processing of these signals into standard color difference signals R-Y,B-Y and into a standard luminance signal Y. However, the additional luminance signal Y' generated in the color martrix unit 11 is incompatible with the standard color proportioning which requires a luminance matrixing in accordance with Y=0.30R+0.59G+0.11B. In order to satisfy the higher resolution, on the one hand, and also satisfy the color proportioning, on the other hand the additional luminance component Y' is fed through a high pass filter 15 and is added to the standard laminance signal to produce a resulting luminance signal Ys in an adding stage 16. As seen from graphs (a) and (b) in FIG. 2, the 6-dB limit frequency fp1 of the low-pass filtered standard luminance signal Y is equal to 6-dB limit frequency fp2 of the high-pass filtered additional luminance signal Y'.

The frequency spectra of the three signals Y,Y' and Ys are illustrated in FIGS. 2a, b, c. Due to the nonuniform weighting of R,G,B a so-called signal folding occurs in signal Y at the frequency range of all multiples of the reading or scanning frequency $f_A$ and the folding superimposes the effective signal (0 to $f_A$). With a uniform weighting of R,G,B the additional luminance signal Y has the triple reading frequency with a corresponding correction of distortion of the partial spectra. The combination of Y and Y' signals from low pass-/high pass filters 12,15 produces in adder 16 only a residual folding error (cross hatched portion in FIG. 2c), which is superimposed on the $Y_s$ signal up to the limit frequency $f_{P1}$ of the low pass filter 12.

When recording pure black/white scene images an effect occurs whereby with the increase of the geometric local frequency due to the offset scanning (FIG. 2d), a color interference in the form of an alias frequency is folded to the given optical frequency around the reading or scanning frequency $f_A$. Thereby, the luminance spectrum folds in the chrominance range around $f_A$ and $2f_A$, while no alias components are generated around 0 and $3f_A$. In order to keep these chrominance interferences very small the low pass filters 13 and 14 are required for the color difference signals R-Y and B-Y. Only one identical limit frequency $f_{P1}$ of the low pass filters 12,13 and 14 is meaningful for color proportioning purposes. In addition, this eliminates the requirement of the delay or transit time adjustment between the luminance and chrominance signals.

The limit frequency $f_{P1}$ of the low pass filters 12,13,14 must be smaller than half of the reading frequency $f_N$ (Nyquist frequency), since a luminance signal Y of this frequency results in a low frequency beat of the alias components generated in the luminance channel as well as in the chrominance channel around the reading frequency $f_A$. In particular the chrominance folding lets a luminance component with Nyquist frequency $f_N$ (0.5$f_A$) appear to be very strongly disturbed on a false color background.

Nonetheless, lower chrominance frequencies which can pass through the described low pass filters 13,14 of the color difference signals R-Y,B-Y, arrive with a luminance signal Y for example in the proximity of the reading frequency $f_A$. As long as the difference frequency of the luminance signal and the scanning rate is smaller than the low pass limit frequency $f_{P1}$, strong color patterns appear in the image, which cannot be differentiated in the chrominance channel from the genuine color information. Only information from the additional luminance signal Y' behind the high pass filter 15 permits a possibility to distinguish between the appearance of genuine or folded chrominance. Therefore, a control voltage is derived from the signal amplitude generated behind the high pass filter. The control voltage suppresses by means of controlled amplifiers 17 and 18 arranged in the color difference channels the possible alias frequencies in the chrominance signal during the appearances of luminance components above the low pass limit frequency $f_{P1}$.

By using a synchronous modulator 19 being operated at the frequency $f_A$ for deriving the control voltage from the additional luminance signal Y' it is assured that with high luminance frequencies, which have an additional low frequency color background structure, the color contained in the real scene image is not suppressed, while in the case of a black/white oscillation of a uniform frequency erroneous chrominance resulting from alias frequencies is prevented.

This will be explained with the assistance of FIG. 3 in an example of an optical scene image which activates only the sensor for red with a frequency $f_0$ in the proximity of the reading frequency $f_A$. Since only one image sensor 2 takes part in the signal scanning the offset is ineffective, so that the additional luminance signal Y' as well as the standard luminance signal Y have a spectrum which reproduces at the reading frequencies $f_A$ (FIG. 3a). In this case, the additional luminance signal Y' contains behind the high pass filter contains 15 spectral components $f_0$ and $2f_A-f_0$ which together represent a beat $f_S$. After the synchronous demodulation a difference oscillation $f=f_A-f_0$ of the same frequency as the resulting low frequency luminance component, is generated. An additional uniform chrominance value, which had been derived from the real scene, is fed to the controlled amplifiers 17,18 with a saturation modulation which is superimposed by the present luminance interference. It is important that the interfering luminance structures do not become even more apparent by the missing color. For example, in a red image all image details which represent higher signal frequencies would be decolored and have a light appearance.

However, if the same frequency $f_0$ appears as a pure black/white signal (FIG. 3b), all three semiconductor-image sensors 1,2,3 are taking part in the optoelectrical conversion and scanning and can contribute to an alias improved Y'-signal. Instead of two frequencies $f_o$ and $2f_A - f_o$ as described in the preceding example only one component is contained at $f_o$. This component also produces after the synchronous demodulation an oscillation at the frequency $f_A - f_o$, but only with half of an amplitude. This amplitude difference can be used as a decision making threshold for the controllable amplifiers 17,18, so as to let the chrominance pass in accordance with this example, while in another case it is recognized as an alias structure and is suppressed.

The described process may also be operated in a modified form in that only two of the three available image sensors are brought into a 2-phase offset, preferably for red and green. In this case a resolution increase by the factor of 2 is obtained for the additional luminance signal Y'. This solution is of interest because of the resulting interference distance, since the image sensor 3 for blue generally represents the least sensitive image sensor which is not used for generating the additional luminance signal Y'.

I claim:

1. A method for increasing the resolution of a solid-state video camera wherein a single image is projected onto three semiconductor image sensors, each sensor including an array of optoelectric sensing elements spaced apart one from the other in both horizontal and vertical directions by an equal distance, said camera including means for scanning said sensing elements of said sensor line-by-line to produce respective output signals from said sensors corresponding to three different colors, a first one of said sensors being offset in the horizontal direction by one-third of said equal distance relative to a second one of said sensors and by two-thirds of said equal distance relative to a third one of said sensors, said scanning means including means for generating one scanning signal for each of said sensors, the scanning signal for said sensor being phase-shifted by 120° relative to the scanning signal for said first sensor and the scanning signal for said third sensor being phase-shifted by 240° relative to the scanning signal for said first sensor, each of said scanning signals having the same frequency, said camera further including means for matrixing said output signals from said sensors to generate a standard luminance signal and standard color-difference signals and means for low-pass filtering said standard luminance and color-difference signals, said method comprising the steps of:

uniformly weighting and adding together said output signals from said sensors to generate an additional luminance signal;

high-pass filtering said additional luninance signal;

adding said high-pass filtered additional luminance signal to said standard luminance signal to produce a resultant luminance signal; and deriving from said high-pass filtered additional luminance signal a control signal for controlling the amplitudes of said standard color-difference signals.

2. A method in accordance with claim 1, wherein said control signal is derived from said high-pass filtered additional luminance signal by means of a synchronous demodulator operating at said frequency of said scanning signals.

3. A method in accordance with claim 1, wherein the low-pass filtered standard luminance and color-difference signals have the same upper limit frequency ($f_{P1}$).

4. A method in accordance with claim 3, wherein said upper limit frequency ($f_{P1}$) of said low-pass filtered standard luminance and color-difference signals is smaller than half of said frequency of said scanning signals ($f_N = 0.5 f_A$).

5. A method in accordance with claim 4, wherein said upper limit frequency of said low-pass filtered standard luminance and color-difference signals is a 6-dB limit frequency, and wherein said high-pass filtered additional luminance signal has a 6-dB lower limit frequency ($f_{P2}$) which is equal to said 6-dB upper limit frequency ($f_{P1}$) of said low-pass filtered standard luminance and color-difference signals.

* * * * *